United States Patent
Bhatia (10) Patent No.: US 8,976,388 B2
(45) Date of Patent: Mar. 10, 2015

(54) PRINTER IDENTIFICATION VALIDATION PROCEDURE ON A CLOUD COMPUTER SYSTEM TO RECOGNIZE THE TARGET PRINTER

(75) Inventor: Rajesh Bhatia, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 129 days.

(21) Appl. No.: 13/483,508

(22) Filed: May 30, 2012

(65) Prior Publication Data

US 2013/0321855 A1    Dec. 5, 2013

(51) Int. Cl.
*G06F 3/12* (2006.01)
*G06K 15/00* (2006.01)

(52) U.S. Cl.
USPC .................. 358/1.15; 358/1.13; 358/1.14

(58) Field of Classification Search
None
See application file for complete search history.

(56) References Cited

U.S. PATENT DOCUMENTS

| | | | |
|---|---|---|---|
| 6,337,745 B1 | 1/2002 | Aiello, Jr. et al. | |
| 6,552,813 B2 | 4/2003 | Yacoub | |
| 6,909,518 B2 | 6/2005 | Miller et al. | |
| 6,975,419 B2 | 12/2005 | Staas et al. | |
| 7,019,861 B2 | 3/2006 | Aagesen | |
| 7,079,276 B2 | 7/2006 | Kimura | |
| 7,084,997 B2 | 8/2006 | Clough | |
| 7,088,462 B2 | 8/2006 | Bhogal et al. | |
| 7,096,265 B2 | 8/2006 | Simpson et al. | |
| 7,167,264 B2 | 1/2007 | Takamiya | |
| 7,187,462 B2 | 3/2007 | Oakeson et al. | |
| 7,321,437 B2 | 1/2008 | Parry | |
| 7,441,003 B1 | 10/2008 | Takeda et al. | |
| 7,474,423 B2 | 1/2009 | Garcia et al. | |
| 7,503,636 B2 | 3/2009 | Ferguson et al. | |
| 7,656,547 B2 | 2/2010 | Kuo et al. | |
| 7,760,385 B2 | 7/2010 | Yamaguchi | |
| 7,791,747 B2 | 9/2010 | Roksz | |
| 8,179,549 B1 | 5/2012 | Evans | |
| 2002/0051180 A1 | 5/2002 | Shimbori et al. | |

(Continued)

FOREIGN PATENT DOCUMENTS

| CN | 101004668 A | 7/2007 |
|---|---|---|
| CN | 101237424 A | 8/2008 |

(Continued)

OTHER PUBLICATIONS

"Printing Overview"; http://support.google.com/chromeos/a/bin/answer.py?hl=en&topic=1329532&p=mkt_enterprise&answer=1329533; 3 pages.

(Continued)

*Primary Examiner* — Eric A Rust
*Assistant Examiner* — Haris Sabah
(74) *Attorney, Agent, or Firm* — Hewlett-Packard Patent Department (57) ABSTRACT

In one embodiment, a request is received at a first computer system included within a first domain. The request is a request to send content to a network connected printer identified according to a printer identifier attributing the printer to a second domain, wherein the printer is included within a third domain. A validation request message is sent to a second computer system within the second domain requesting validation of the printer identifier. Responsive to receipt of validation information from the second system, the content, or a content availability message that the content is available to be obtained by the printer, is sent to a third computer system within the third domain, for the third system to forward to the printer.

20 Claims, 4 Drawing Sheets

(56) References Cited

U.S. PATENT DOCUMENTS

| | | | |
|---|---|---|---|
| 2002/0057449 | A1 | 5/2002 | Chapman et al. |
| 2003/0011801 | A1 | 1/2003 | Simpson et al. |
| 2003/0063309 | A1 | 4/2003 | Parry |
| 2003/0107762 | A1 | 6/2003 | Kinoshita et al. |
| 2003/0160977 | A1 | 8/2003 | Nishikawa et al. |
| 2004/0073574 | A1 | 4/2004 | Shimizu et al. |
| 2004/0126165 | A1 | 7/2004 | Carroll |
| 2004/0218201 | A1 | 11/2004 | Lermant et al. |
| 2004/0218213 | A1 | 11/2004 | Shimizu et al. |
| 2005/0270569 | A1 | 12/2005 | Hayashi |
| 2005/0275876 | A1 | 12/2005 | McLean et al. |
| 2006/0158681 | A1 | 7/2006 | Yorimoto et al. |
| 2006/0250631 | A1 | 11/2006 | Igarashi |
| 2006/0250638 | A1 | 11/2006 | Wang et al. |
| 2006/0265473 | A1* | 11/2006 | Muto .............................. 709/218 |
| 2007/0086038 | A1 | 4/2007 | Matsuzaki |
| 2007/0146763 | A1 | 6/2007 | Yokoyama |
| 2008/0062883 | A1* | 3/2008 | Shima ............................ 370/241 |
| 2009/0009802 | A1 | 1/2009 | Shaw et al. |
| 2009/0027700 | A1 | 1/2009 | Kim et al. |
| 2009/0172143 | A1* | 7/2009 | Ishimoto ........................ 709/223 |
| 2009/0219570 | A1 | 9/2009 | Fujisawa |
| 2009/0248632 | A1 | 10/2009 | Subramanian |
| 2009/0273810 | A1* | 11/2009 | Gupta et al. .................. 358/1.18 |
| 2010/0020349 | A1 | 1/2010 | Carroll |
| 2010/0309510 | A1 | 12/2010 | Hansen |
| 2010/0328707 | A1 | 12/2010 | Miyake |
| 2011/0007347 | A1 | 1/2011 | Kamath et al. |
| 2011/0013219 | A1 | 1/2011 | Nuggehalli et al. |
| 2011/0063668 | A1 | 3/2011 | Shirai |
| 2011/0096354 | A1 | 4/2011 | Liu |
| 2011/0145351 | A1 | 6/2011 | Lee et al. |
| 2011/0231473 | A1 | 9/2011 | Narayanan et al. |
| 2012/0057204 | A1* | 3/2012 | Mizoguchi et al. ........... 358/1.15 |
| 2012/0102413 | A1 | 4/2012 | Gnanamoorthy |
| 2012/0206765 | A1* | 8/2012 | Nakajo .......................... 358/1.15 |
| 2012/0250074 | A1 | 10/2012 | Kamppari et al. |
| 2012/0250076 | A1 | 10/2012 | Kumar et al. |
| 2012/0272339 | A1 | 10/2012 | Kumaravel et al. |
| 2013/0107312 | A1 | 5/2013 | Venkatesh |
| 2013/0182281 | A1 | 7/2013 | Suzuki |

FOREIGN PATENT DOCUMENTS

| | | |
|---|---|---|
| CN | 101520829 A | 9/2009 |
| JP | 2007133817 A | 5/2007 |
| KR | 20060109699 A | 10/2006 |
| WO | WO-0041064 A1 | 7/2000 |
| WO | WO-2012112159 A1 | 8/2012 |
| WO | WO-2012147089 A1 | 11/2012 |

OTHER PUBLICATIONS

Wikipedia, "HP ePrint," Oct. 16, 2011, found at <https://web.archive.org/web/20111016081246/http://en.wikipedia.org/wiki/HP_ePrint>.

Xerox®, "Xerox® Mobile Print," (Web Page), 2011, found at http://ww.office.xerox.com/software-solutions/xerox-mobile-print-solution/enus.html.

Extended European Search Report received in EP Application No. 11864184, Sep. 8, 2014, 9 pages.

Hewlett-Packard Development Company, LP., "HP Universal Print Driver," Solution and Feature Guide, 2009, 24 pages, found at http://h20331.www2.hp.com/Hpsub/downloads/UPD5_guide_final,%20web.pdf.

International Preliminary Report on Patentability received in PCT Application No. PCT/US2011/025293, Aug. 29, 2013, 6 pages.

International Search Report & Written Opinion received in PCT Application No. PCT/US2011/025293, Sep. 29, 2011, 9 pages.

Silveria, L., "Itinerary not displaying in account," TripIt Help Center, Nov. 9, 2009, 2 pages, found at https://tripit.zendesk.com/entries/77324-Itinerary-not-displaying-in-account.

Trapani, G., "TripIt Organizes Your Travel Itinerary Automatically via Email," Lifehacker, Sep. 18, 2007, 3 pages, found at http://lifehacker.com/300833/tripit-organizes-your-travel-itinerary-automatically-via-email.

Wikipedia, "Posterous," Dec. 10, 2010, 3 pages, found at http://en.wikipedia.org/w/index.php?title=Posterous&oldid=401625056.

International Preliminary Report on Patentability received in PCT Application No. PCT/IN2011/000423, Nov. 7, 2013, 6 pages.

"Printing Overview"; http://support.google.com/chromeos/a/bin/answer.py?hl=en&topic=1329532&p=mkt_enterprise&answer=1329533; 3 pages; Apr. 20, 2012.

Aranda, D.M.; "Architectures for Cloud Providers Federation—Authorization of Diffusion"; Sep. 2011; 51 pages.

Schwartz, J. et al; "IBM Launches Enterprise Cloud Services"; Jun. 16, 2009; 3 pages.

Equitrac, "Rules & Routing," 2010, 2 pages, found at http://www.equitrac.com/downloads/5379-Rules-Routing_7-10.pdf, pub in 2010.

Experts Exchange, "Setting Up Multiple Printers Using Same IP Address with Different Ports," (Web Page), 2010, 3 pages, found at http://www.experts-exchange.com/OS/Microsoft_Operating_Systems/Server/2003_Server/Q_26107790.html, Dec. 15, 2010.

Hewlett-Packard Company, "Print Where Business Happens," (Research Paper), Jul. 5, 2012, 2 pages.

Hewlett-Packard Development Company, L.P., "Cloud printing in the enterprise: Liberating the mobile print experience from cables, operating systems and physical boundaries," (Executive Summary), Mar. 2010.

International Search Report & Written Opinion, received for PCT Application No. PCT/IN2011/000423, Feb. 9, 2012, 11 pages.

Namtuk, "Automatic Print Email," (Web Page), 2011, found at http://www.automatic-print-email.com/.

Printech, "Intelligent Print Job Routing," (Web Page), 2009, found at http://www.printech.com/intelligent_print_job_routing.htm.

Ricoh, "doc-Q-manager, The Enterprise-wide Network Solution for Effective Print Job Management," Printing Solutions for Aficio Series, available Oct. 3, 2006, at <http://www.ricoh-photocopiers.co.uk/Print_Management/DocQManagerBro.

Wikipedia, "HP ePrint," Oct 16, 2011, found at <https://web.archive.org/web/20111016081246/http://en.wikipedia.org/wiki/HP_ePrint>.

Wolber, A., "Print anywhere: Chrome, Google Apps and Cloud Print," (Web Page), Oct. 9, 2012, found at http://www.techrepublic.com/blog/google-in-the-enterprise/print-anywhere-chrome-google-apps-and-cloud-print/.

\* cited by examiner

PRINTER IDENTIFICATION VALIDATION PROCEDURE ON A CLOUD COMPUTER SYSTEM TO RECOGNIZE THE TARGET PRINTER

BACKGROUND

Certain network-connected printers are capable of sending and receiving communications and printable content via the Internet or another network without being connected to a desktop computer, notebook computer, or other host computing device. Such functionality can provide considerable flexibility and efficiencies for a user, as the user may have the ability to download and print content at familiar and unfamiliar printers without the complication of first establishing a connection with a host.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

An advantage of an internet-connected printer is that content can be obtained and printed at the printer via a public cloud printer service or an enterprise cloud print service, without the printer being connected to a host computing device. A limitation to this advantage has been that the public cloud print services and enterprise cloud print services are typically been designed for significantly different user requirements, such that it has been difficult to integrate the two cloud services.

For example, an enterprise cloud print service is typically highly focused on network security and has significant controls as to the type of content and conditions in which printing is permitted. Enterprises will frequently apply various policies as to the copying, transmission, and printing of data and content within the enterprise domain. Likewise, enterprise domains will frequently apply various policies as to the naming of printers and other computer resources, sometimes requiring that a printer have an identifier that is closely aligned with the enterprise name's or an IT naming policy. Through such controls, an enterprise through policies can control a print queue for final delivery to a printer, and allocate print jobs between printers.

On the other hand, a public cloud print service is designed to offer flexibility and simplicity that is attractive to users of network connected printers in a home or other non-enterprise environment. With a public cloud print service, print jobs and content are typically sent to the printers over the public internet. This affords users with great flexibility as to the user's location relative to the printer, and with respect to alternative data paths in the event a particular service, carrier, etc. has downtime. Further, public cloud print services are typically unencumbered or lightly encumbered with controls as to type of content being printed, the identity of the user requesting the printing, and what will be the cost of the printing, etc. For example, a public cloud print service may allow a user to name a printer with an identity that is closely tied to the user's current role or current location, without being unduly constrained by a network naming conventions or policies that would be typical in an enterprise cloud print environment.

Because of the differences in the objectives of public cloud print services and the enterprise cloud services, integration of the two services has been difficult to accomplish. Enterprise cloud print services are typically hosted at a proprietary server system and with no robust connection with a public cloud print environment. This can limit the enterprise print service's connectivity with mobile devices, thus making it more difficult to send print jobs from public print locations, e.g., restaurants, airports, etc. In these and other situations would be advantageous for a user to have the ability to send a print request in the public cloud print domain, wherein there is flexibility and fewer policies associates with the onramp, and have the print process fulfilled within an enterprise domain such that security and other policies can be applied.

Accordingly, various embodiments described herein were developed to enable users of network connected printers to utilize a system that is a hybrid of the public and enterprise cloud printing services, wherein part of the service executes within the public domain, and part of the service executes within an enterprise domain. In examples of the disclosure, a first computer system is included within a first domain that is a public cloud print domain. The first computer system receives a request to send content to a network connected printer identified according to a printer identifier attributing the printer to a second domain that is an enterprise cloud print domain, wherein the printer is included within a third domain that is also an enterprise cloud print domain. The first computer system sends a validation request message to a second computer system within the second domain, the message requesting validation of the printer identifier. In examples, the first computer system additionally requests and receives from the second computer system policy validations for the print job. Responsive to receipt of the requested validation information from the second computer system, the first computer system sends to a third computer system within the third domain, the content for the third system to forward to the printer, or a message that the content is available to be obtained via the network by the printer.

Advantages of the disclosure include that the public cloud print services and enterprise cloud print services can be utilized together to capitalize on the strengths of each. This disclosure allows a user to benefit from the enterprise cloud's network security and controls as to the type of content and conditions in which printing is permitted. This disclosure affords the user the flexibility and convenience to assign a printer name to a chosen printer without regard to the domain in which the printer is located. At the same time, this disclosure allows for the use of enterprise printer naming conventions in order that the enterprise computer systems will recognize and can validate the chosen printer resource. User satisfaction with network-connected printers and printing will increase as the disclosed hybrid cloud print system affords users the flexibility of utilizing a public cloud print service as an onramp to cloud printing, while utilizing the enterprise cloud service to enforce security and pricing policies in conjunction with final delivery and printing of a print job.

As used in this application, a "printer" or "printing device" refers to any liquid inkjet printer, solid toner-based printer, liquid toner-based printer, or any other electronic device that prints. "Printer" or "printing device" includes any multifunctional electronic device that performs a function such as scanning and/or copying in addition to printing. A "network-connected printer" refers to a printer that is connected to a network, to be capable of obtaining content, sending and receiving messages, accessing network content, and/or accessing applications via the network. In examples, the network may be a proprietary network, a secured network, an open network, an intranet, an extranet, or an internet. "Content" refers to text, images, and/or other subject matter or other information that can be received by a computer system for printing, and/or stored at the computer system, e.g., for later printing ("subject matter content"). In some cases, "content" may additionally include instructions as to formatting and presentation of the subject matter content ("instruction content"). A "public cloud printer service" refers to service that enables users to send content and otherwise communicate with network connected printers via a network (e.g., the Internet) without restriction based upon user employment or other group affiliation. An "enterprise cloud printer service" refers to service that enables users to send content and otherwise communicate with network connected printers via a secure network (e.g., the Internet) with restrictions based upon user employment, other group affiliation. A "domain" refers to a defined realm of administrative autonomy, authority, or control within a network or the Internet. In an example, without limitation, an ABC public cloud print service may be available to users without restriction based upon user employment or other group affiliation, a DEF enterprise cloud print service of a DEF enterprise is available to users that are employees or contractors of the DEF enterprise, and a GHI enterprise cloud print service of a GHI enterprise is available to users that are employees or contractors of the GHI enterprise. In this example, the public cloud print service, the DEF enterprise cloud print service, and the GHI enterprise cloud print service are within different domains. A "printer identifier" refers to something, e.g., a character string that can be processed and stored by a computer, that identifies, indicates, or names a printer.

Figure 1:
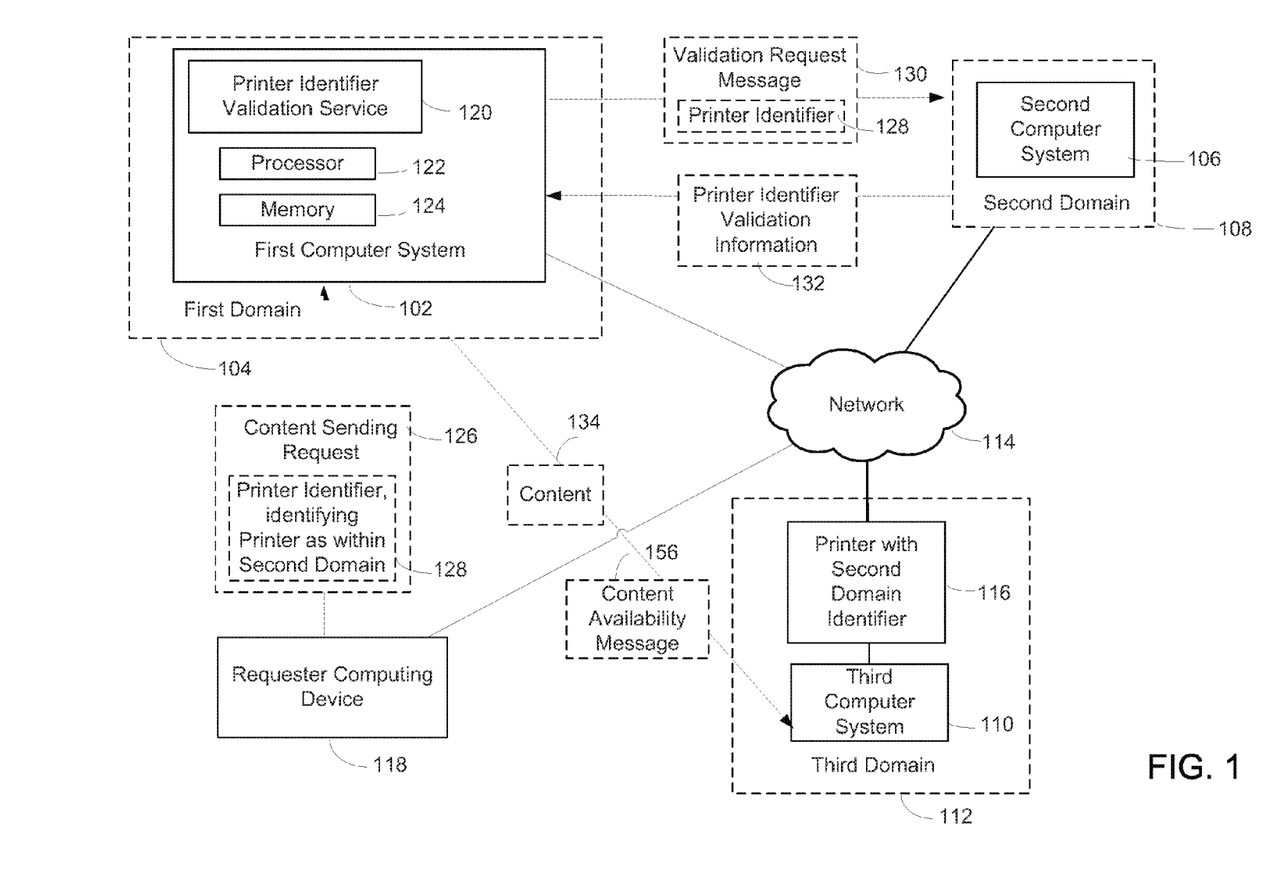
FIG. 1 is a block diagram illustrating a system according to various embodiments.

FIG. 1 shows a first computer system 102, included within a first domain 104, a second computer system 106 included within a second domain 108, and a third computer system 110 included within a third domain 112. Each of the first, second, and third computer systems 102 106 110 are electronically connected to each other via a network 114. First computer system 102 represents generally any computing device or group of computing devices configured to send and receive network requests, send and receive data, and/or otherwise communicate with the second and third computer systems 106 110. Second computer system 106 represents generally any computing device or group of computing devices configured to send and receive network requests, send and receive data, and/or otherwise communicate with the first and third computer systems 102 110. Third computer system 106 represents generally any computing device or group of computing devices configured to send and receive network requests, send and receive data, and/or otherwise communicate with the first and second computer systems 102 106. In examples, any of first computer system 102, second computer system 106, or third computer system 110 may be or include a server, desktop computer, notebook computer, mobile device, tablet computer, and/or any other computing device.

FIG. 1 additionally shows a network connected printer 116 included within the third domain 112. The printer 116 represents generally any computing device or group of computing devices operable to produce a printed print job or printed content, and additionally operable to send and receive internet requests, receive printable content and print jobs, and otherwise communicate with, the third computer system 110, within the third domain 112, via the network 114.

FIG. 1 additionally shows a requester computing device 118, which is not specific to any domain. The requester computing device 118 is electronically connected to the first computer system 102 via the network 114. The requester computing device 118 represents generally any computing device or group of computing devices configured to send and receive network requests, send and receive data, and/or otherwise communicate with the first computer system 102 within the first domain 104. In an example, the requester computing device 118 may be a smartphone, tablet computer, notebook computer, or any other mobile computing device. In other examples, the requester computing device 118 may be or include a server, desktop computer, and/or any other computing device.

Network 114 represents generally hardware components and computers interconnected by communications channels that allow sharing of resources and information. Network 114 may include a cable, wireless, fiber optic, or remote connection via a telecommunication link, an infrared link, a radio frequency link, or some combination of these, or any other connectors or systems that provide electronic communication. Network 114 may include, at least in part, an intranet, the internet, or a combination of both. Network 114 may also include intermediate proxies, routers, switches, load balancers, and the like. The paths followed by network 114 between the first computer system 102, second computer system 106, third computer system 110, and printer 116 as depicted in FIG. 1 represent the logical communication paths between these devices, not necessarily the physical paths between the devices.

Computer system 102 is shown to include a printer identifier validation service 120, a processor 122, and a memory 124. Printer identifier validation service 110 represents generally any combination of hardware and programming configured to enable a computer user to share a print job or scan job that is associated with that computer user, with other computer users that are social network contacts of the sharing user. Processor 122 represents generally any instruction execution system, such as a computer/processor based system or an ASIC (Application Specific Integrated Circuit), a computer, or other system that can fetch or obtain instructions or logic stored in memory 124 and execute the instructions or logic contained therein. Memory 124 represents generally any memory configured to store program instructions and other data.

In the example of FIG. 1, the printer identifier validation service 110 executing at computer system 102 of the first domain receives a content sending request 126 from the requester computing device 118. The request is a request for the validation service 120 to send content 134 to the printer 116 that resides in the third domain 112, for printing at the printer 116. However, the request 126 identifies the network connected printer 116 according to an email address or other printer identifier 128 that attributes the printer 116 to the second domain 108. In an example, the content sending request 126 may additionally include the content to be printed, or an instruction for the first computer system 102 to retrieve or otherwise obtain, via a URL or other web content address, web content to be printed. In an example, the URL or address may also be included within the content sending request 126.

Responsive to receipt of the content sending request 126, the validation service 120 sends a validation request message 130 to the second computer system 106, within the second domain 108. The validation request message 230 requests that the second computer system 106 validate the email address or other printer identifier 128 as a valid and/or authorized identifier for a physical or virtual printing resource with the second domain 108.

The second computer system 106 sends printer identifier validation information 132 to the first computer system 102 to confirm the authenticity or authorization of the printer identifier 128. In an example, responsive to receipt of the validation information 132 from the second computer system 106, the validation service 120 sends the content 134 to the third computer system 110 within the third domain 112 for the third system 110 to forward to the printer 116. The printer 116 in turn prints the content 134 to create and output a hard copy of the content 134. In another example, responsive to receipt of the validation information 132 from the second computer system 106, the validation service 120 sends a content availability message 156 that the content 134 is available to be obtained from the first computer system 102 via the network 114 by the printer 116. In the latter example, the printer may send a content delivery request to the first computer system 102 via the network 114, to cause the first computer system 102 to send the content to the printer 116 via the network 114. The printer 116 in turn prints the content 134 to create and output a hard copy of the content 134.

In examples, the content sending request 126 and the printer identifier validation information 132 may be received by, and the validation request message 130 and the content 134 sent by, first computer system 102 over the network 114 via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

The functions and operations described with respect to printer identifier validation service 120 and first computer system 102 may be implemented as a non-transitory computer-readable storage medium containing instructions executed by a processor (e.g., processor 122) and stored in a memory (e.g., memory 124). In a given implementation, processor 122 may represent multiple processors, and memory 124 may represent multiple memories. Processor 122 represents generally any instruction execution system, such as a computer/processor based system or an ASIC (Application Specific Integrated Circuit), a computer, or other system that can fetch or obtain instructions or logic stored in memory 124 and execute the instructions or logic contained therein. Memory 124 represents generally any memory configured to store program instructions and other data.

Figure 2:
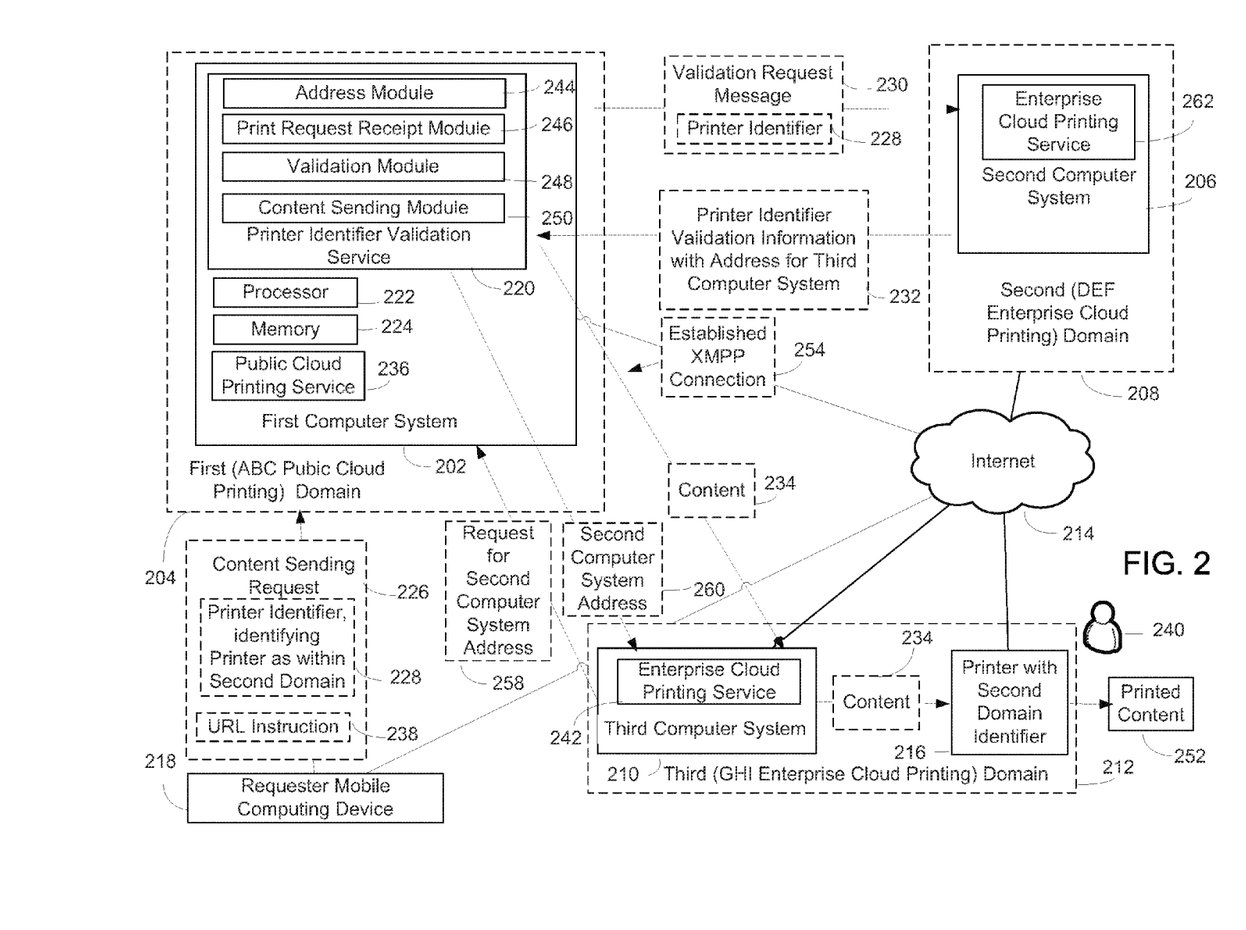
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a first computer system 202, included within a first public domain 204 that is an "ABC Public Cloud Printing Domain", a second computer system 206 included within a second domain 208 that is a "DEF Enterprise Cloud Printing" domain, and a third computer system 210 included within a third domain 212 that is a "GHI Enterprise Cloud Printing" domain. Each of the first, second, and third computer systems 202 206 210 are electronically connected to each other via an internet 214. First computer system 202 represents generally any computing device or group of computing devices configured to send and receive network requests, send and receive data, and/or otherwise communicate with the second and third computer systems 206 210. Second computer system 206 represents generally any computing device or group of computing devices configured to send and receive network requests, send and receive data, and/or otherwise communicate with the first and third computer systems 202 210. Third computer system 206 represents generally any computing device or group of computing devices configured to send and receive network requests, send and receive data, and/or otherwise communicate with the first and second computer systems 202 206. In examples, any of first computer system 202, second computer system 206, or third computer system 210 may be or include a server, desktop computer, notebook computer, mobile device, tablet computer, and/or any other computing device.

FIG. 2 additionally shows an internet connected printer 216 included within the GHI Enterprise Cloud Printing domain 212. The printer 216 represents generally any computing device or group of computing devices operable to produce a printed print job or printed content, and additionally operable to send and receive internet requests, receive printable content and print jobs, and otherwise communicate with, the third computer system 210 of the GHI Enterprise Cloud Printing domain 212, via the internet 214.

FIG. 2 additionally shows a requester mobile computing device 218, which is not specific to any domain. The requester mobile computing device 218 is electronically connected to the first computer system 202 via the internet 214. The requester mobile computing device 218 represents generally any mobile computing device or group of computing devices configured to send and receive network requests, send and receive data, and/or otherwise communicate with the first computer system 202 within the ABC Public Cloud Printing 204. In an example, the requester mobile computing device 218 may be a smartphone, tablet computer, notebook computer, or any other mobile computing device. In other examples, the requester mobile computing device 218 may instead of a mobile computing device, be a server, desktop computer, or any other computing device, or a combination of such computing devices.

Internet 214 represents generally hardware components and computers interconnected by communications channels that allow sharing of resources and information over an internet or intranet network, or over a combination of both. Internet 214 may include a cable, wireless, fiber optic, or remote connection via a telecommunication link, an infrared link, a radio frequency link, or some combination of these, or any other connectors or systems that provide electronic communication. Internet 214 may also include intermediate proxies, routers, switches, load balancers, and the like. The paths followed by internet 214 between the first computer system 202, second computer system 206, third computer system 210, and printer 216 as depicted in FIG. 2 represent the logical communication paths between these devices, not necessarily the physical paths between the devices.

Computer system 202 is shown to include a printer identifier validation service 220, a processor 222, and a memory 224. Printer identifier validation service 220 represents generally any combination of hardware and programming configured to enable users of internet connected printers to utilize a system that is a hybrid of the public and enterprise cloud printing services, wherein part of the service executes within the public domain, and part of the service executes within an enterprise domain. The printer validation service 220 includes an address module 244, a print request receipt module 246, a validation module 248, and a content sending module 250. Computer system 202 additionally hosts a public cloud printing service 236. Processor 222 represents generally any instruction execution system, such as a computer/processor based system or an ASIC (Application Specific Integrated Circuit), a computer, or other system that can fetch or obtain instructions or logic stored in memory 224 and execute the instructions or logic contained therein. Memory 224 represents generally any memory configured to store program instructions and other data.

In the example of FIG. 2, DEF employee user 240 registers an email address printer identifier john.smith.print@DEF.com 228 (associated with the DEF Enterprise Cloud Printing domain) with the GHI Enterprise Cloud Printing Service 242 as an identifier for internet connected printer 216 within the GHI Enterprise Cloud Printing domain 212. In an embodiment, the printer identifier 228 was created within the enterprise cloud printing service 262 that executes at the second computer system 206. In an embodiment the printer identifier was registered within the enterprise cloud printing service 262 that executes at the second computer system 206 prior to being registered by the DEF employee user 240 at the at the enterprise cloud printing service 242 that executes at the third computer system 210.

In response to the DEF employee user's 240 registration of the DEF enterprise cloud domain printer identifier within the GHI enterprise cloud printing service 242 within the GHI Enterprise Cloud Printing domain 212, the third computer system 210 within the GHI Enterprise Cloud Printing domain 212 sends a message to the second computer system 206 within the DEF Enterprise Cloud Printing domain 208 informing that any request received at the second computer system 206 should be sent to the third computer system 210.

In some examples, the third computer system 210 will not have an IP address or other address to contact the second computer system. In an example, after receipt of the DEF user's 240 request to register the printer 216 within the third computer system 242 utilizing the john.smith.print@DEF.com printer identifier, the third computer system 210 sends a system address request 258 to the first computer system 202 asking that the first computer system 202 provide an IP or other internet address for the second computer system 206. Responsive to receipt of the system address request 258, the address module 244 of the printer identifier validation service 220 provides a second computer system IP address 258 to the third computer system 210. Providing of the address 260 enables the third computer system 210 to send the instruction or request to second computer system 206 that print requests addressed to the printer identifier john.smith.print@DEF.com and received by the second computer system be directed to the third computer system 210.

Subsequent to the DEF employee user 240's registration of the DEF enterprise cloud domain printer identifier within the GHI enterprise cloud printing service 248 and the GHI cloud printing domain 212, the print request receipt module 246 executing at the first computer system 202 receives a content sending request 226 from the requester mobile computing device 218. The content sending request 226 is a request for the validation service 220 to send content 234 to an internet connected printer 216 that is identified according to the john.smith.print@DEF.com printer identifier 228 that attributes the printer 216 to the DEF Enterprise Cloud Printing domain 208. In this example, the content sending request 226 includes a URL or other web content address for the first computer system to obtain the content via the Internet 214. In other examples, the content sending request 226 sent to the first computer system may include the content to be printed.

Responsive to receipt of the content sending request 226, the validation module 248 sends a validation request message 230 to the second computer system 206, within the DEF Enterprise Cloud Printing domain 208. The validation request message 230 requests that the second computer system 206 validate the printer identifier 228 as a valid and/or authorized identifier for a physical or virtual printing resource with the DEF Enterprise Cloud Printing domain 208.

The second computer system 206 sends printer identifier validation information 232 to the first computer system 202 to confirm the authenticity or authorization of the john.smith.print@DEF.com printer identifier 228. In an example, the validation information 232 includes an IP address or other address for third computer system 210, such that the first computer system 202 in the ABC Public Cloud Printing domain 204 can send the content 204 to the third computer system 210.

Responsive to receipt of the validation information 232 from the second computer system 206, the content sending module 250 in this example establishes an electronic connection between the first computer system 202 and the third computer system 210 via a XMPP interface 254. In the example of FIG. 2, after establishment of the XMPP interface 254, the content sending module 250 sends the content 234 to the third computer system 210 for the computer third system 210 to forward to the printer 216. The third computer system 210 forwards the content 234 to the printer 216, and the printer 216 in turn prints the content 234 to create and output a hard copy 252 of the content 234.

The functions and operations described with respect to printer identifier validation service 220 and first computer system 202 may be implemented as a non-transitory computer-readable storage medium containing instructions executed by a processor (e.g., processor 222) and stored in a memory (e.g., memory 224). In a given implementation, processor 222 may represent multiple processors, and memory 224 may represent multiple memories. Processor 222 represents generally any instruction execution system, such as a computer/processor based system or an ASIC (Application Specific Integrated Circuit), a computer, or other system that can fetch or obtain instructions or logic stored in memory 224 and execute the instructions or logic contained therein. Memory 224 represents generally any memory configured to store program instructions and other data.

Figure 3:
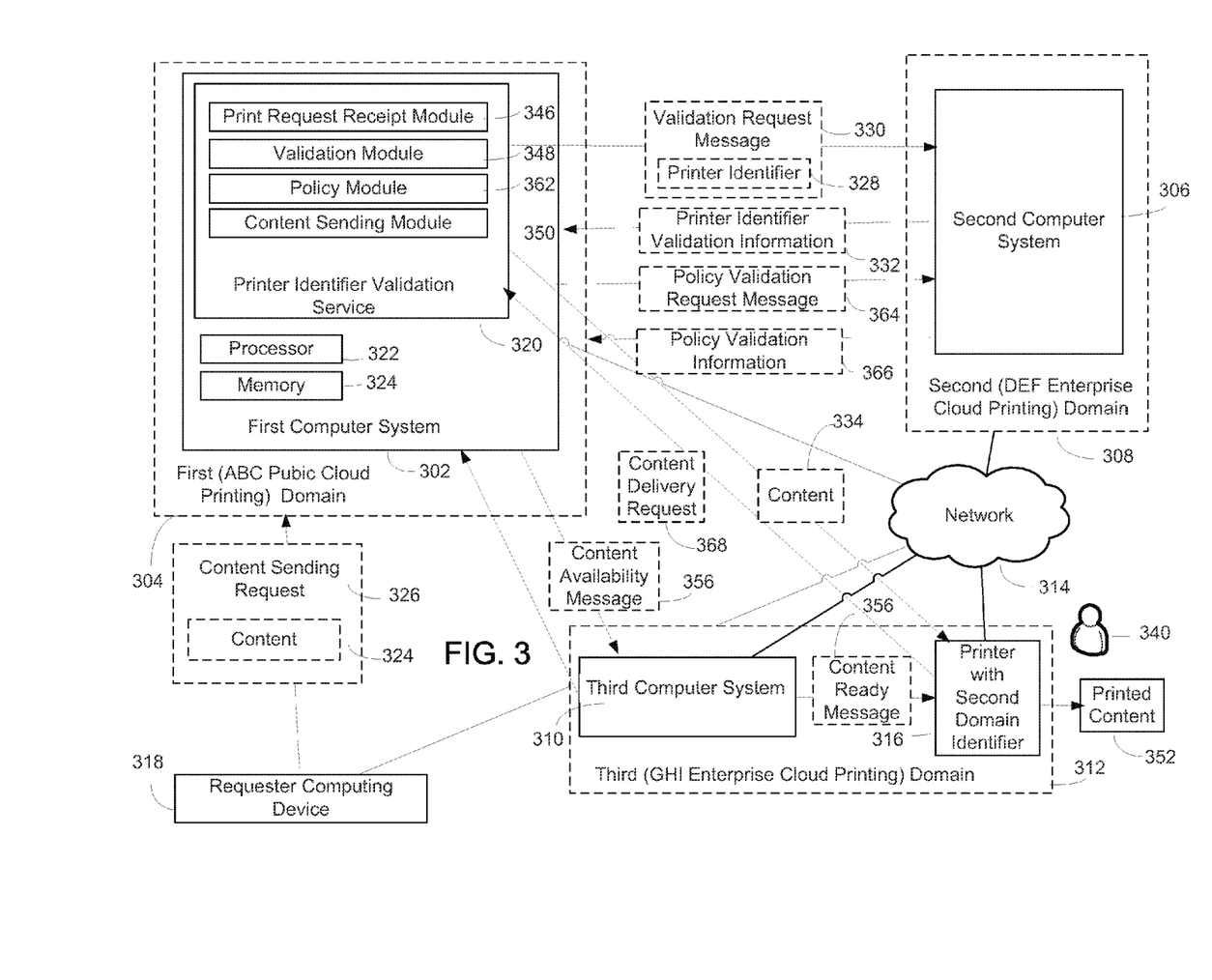
FIG. 3 is a block diagram illustrating a system according to various embodiments.

FIG. 3 is a block diagram illustrating a system according to various embodiments. FIG. 3 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 3 shows a first computer system 302, included within a first public domain 304 that is an "ABC Public Cloud Printing Domain", a second computer system 306 included within a second domain 308 that is a "DEF Enterprise Cloud Printing" domain, and a third computer system 310 included within a third domain 312 that is a "GHI Enterprise Cloud Printing" domain. Each of the first, second, and third computer systems 302 306 310 are electronically connected to each other via a network 314. FIG. 3 additionally shows a network connected printer 316 included within the GHI Enterprise Cloud Printing domain 312. FIG. 3 additionally shows a requester mobile computing device 318, which is not specific to any domain. The requester mobile computing device 318 is electronically connected to the first computer system 302 via the network 314. The requester mobile computing device 318 represents generally any mobile computing device or group of computing devices configured to send and receive network requests, send and receive data, and/or otherwise communicate with the first computer system 302 within the ABC Public Cloud Printing 304. In an example, the requester mobile computing device 318 may be a smartphone, tablet computer, notebook computer, or any other mobile computing device. In other examples, the requester mobile computing device 318 may, instead of a mobile computing device, be a server, desktop computer, or any other computing device, or a combination of such computing devices.

Computer system 302 is shown to include a printer identifier validation service 320, a processor 322, and a memory 324. Printer identifier validation service 320 represents generally any combination of hardware and programming configured to enable users of network connected printers to utilize a system that is a hybrid of the public and enterprise cloud printing services, wherein part of the service executes within the public domain, and part of the service executes within an enterprise domain. The printer validation service 320 includes a print request receipt module 346, a validation module 348, a policy module 362, and a content sending module 350. Processor 322 represents generally any instruction execution system, such as a computer/processor based system or an ASIC (Application Specific Integrated Circuit), a computer, or other system that can fetch or obtain instructions or logic stored in memory 324 and execute the instructions or logic contained therein. Memory 324 represents generally any memory configured to store program instructions and other data.

In the example of FIG. 3, DEF employee user 340 registers a printer identifier john.smith.print@DEF.com 328 (associated with the DEF Enterprise Cloud Printing domain) with the GHI Enterprise Cloud Printing Service 342 as an identifier for network connected printer 316 within the GHI Enterprise Cloud Printing domain 312.

Subsequent to such registration, the print request receipt module 346 executing at the first computer system 302 receives a content sending request 326 from the requester mobile computing device 318. The content sending request 326 is a request for the validation service 320 to send content 334 to a network connected printer 316 that is identified according to the john.smith.print@DEF.com printer identifier 328 that attributes the printer 316 to the DEF Enterprise Cloud Printing domain 308. In this example, the content sending request 326 includes the content 334 to be printed.

Responsive to receipt of the content sending request 326, the validation module 348 sends a validation request message 330 to the second computer system 306, within the DEF Enterprise Cloud Printing domain 308. The validation request message 330 requests that the second computer system 306 validate the printer identifier 328 as a valid and/or authorized identifier for a physical or virtual printing resource with the DEF Enterprise Cloud Printing domain 308.

In this example, also responsive to receipt of the content sending request 326, the policy module 362 sends a policy validation request message 364 to the second system requesting a policy validation for the received content sending request 326. In an example, the policy validation request 364 includes a request for the second computer system 306 to validate that the content type of content 334 is permissible according to content type policies applicable to the DEF Enterprise Cloud Printing domain 308. In an example, the policy validation request 364 includes a request for the second computer system 306 to validate that the requester computing device 318 that sends the content sending request 326 to the first computer system 302 is an authorized or permitted sender of content to the printer 316. In an example, the policy validation request 364 includes a request for the second computer system 306 to validate that a payment due in connection with printing of the content 334 has been made or received. In an example, the policy validation request 364 is to validate a payment due in connection with printing of the content 334 by the printer 316. In an example, the policy validation request 364 is to validate a payment due in connection with the sending of the content 334 to the printer 316.

Responsive to receipt of the printer identifier validation request message 330 and the policy validation request message 364, the second computer system 306 sends the requested printer identifier validation information 332 and the requested policy validation information 366 to the first computer system 302. The printer identifier validation information 332 and the policy validation information 366 is received by the printer identifier validation service 320. The printer identifier validation information 332 confirms the authenticity or authorization of the john.smith.print@DEF.com printer identifier 328. The policy validation information 366 confirms that the request to send the content 334 to the printer 316 is in compliance with printing and/or other policies applicable to the second computer system 306 or the DEF Enterprise Cloud Printing domain 308.

In the example of FIG. 3, responsive to receipt of the printer identifier validation information 332 and the policy validation information 366 from the second computer system 306, the content sending module 350 sends to the third computer system 310 for forwarding to the printer 316, a content availability message 356 that the content is available to be retrieved or otherwise obtained via the network 314 by the printer 316. The printer 316 in turn sends a content delivery request 368 to the first computer system 302, and the first computer system 302 sends the content 334 to the printer 316. Upon receipt of the content 334, the printer 316 prints the content 334 to create and output a hard copy 352 of the content 334.

The functions and operations described with respect to printer identifier validation service 320 and first computer system 302 may be implemented as a non-transitory computer-readable storage medium containing instructions executed by a processor (e.g., processor 322) and stored in a memory (e.g., memory 324). In a given implementation, processor 322 may represent multiple processors, and memory 324 may represent multiple memories. Processor 322 represents generally any instruction execution system, such as a computer/processor based system or an ASIC (Application Specific Integrated Circuit), a computer, or other system that can fetch or obtain instructions or logic stored in memory 324 and execute the instructions or logic contained therein. Memory 324 represents generally any memory configured to store program instructions and other data.

Figure 4:
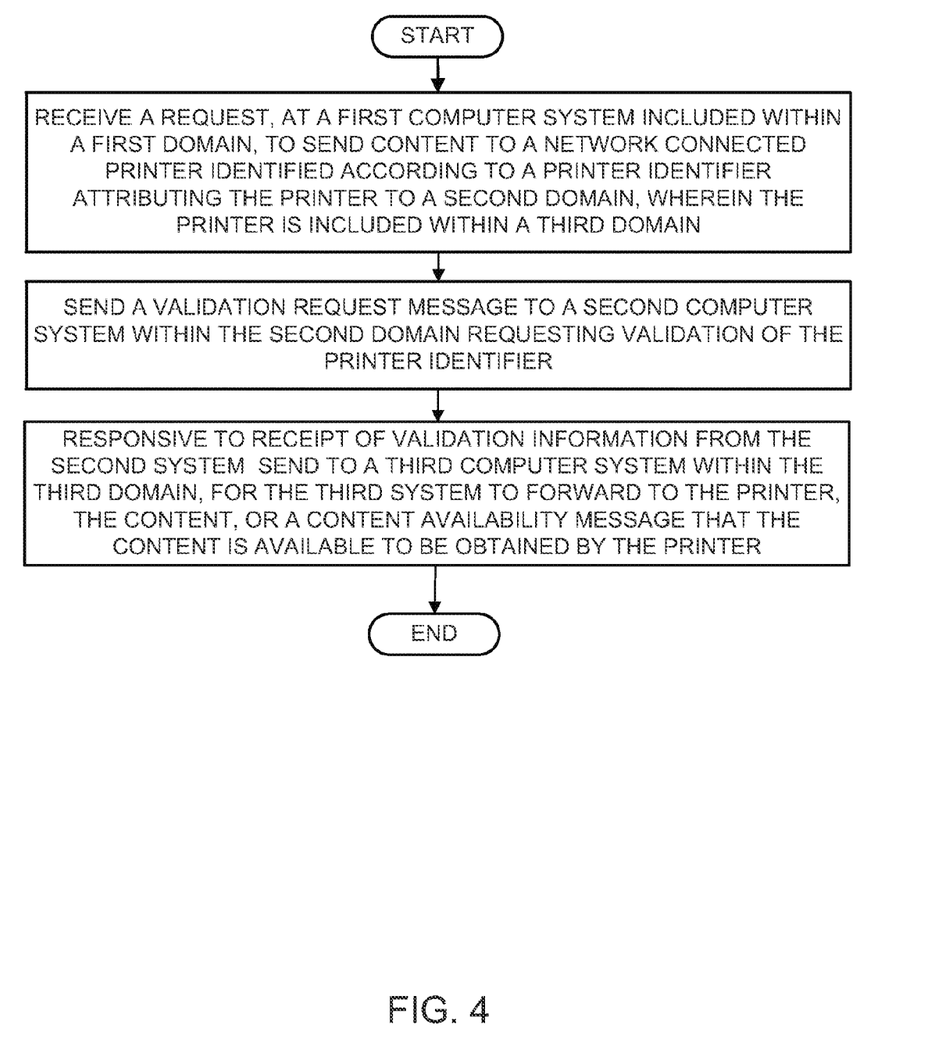
FIG. 4 is a flow diagram depicting steps taken to implement various embodiments.

FIG. 4 is a flow diagram of operation in a system according to various embodiments. In discussing FIG. 4, reference may be made to the diagrams of FIGS. 2 and 3 to provide contextual examples. Implementation, however, is not limited to those examples. Starting with FIG. 4, a first computer system included within a first domain receives a request. The request is a request that the first computer system send content to a network connected printer identified according to a printer identifier attributing the printer to a second domain, wherein the printer is included within a third domain (block 402). Referring back to FIGS. 2 and 3, print request receipt module 246 or 346 may be responsible for implementing block 402.

Continuing with FIG. 4, the first computer system sends a validation request message to a second computer system within the second domain requesting validation of the printer identifier (block 404). Referring back to FIGS. 2 and 3, validation module 248 or 348 may be responsible for implementing block 404.

Continuing with FIG. 4, responsive to receipt of validation information from the second computer system, the first computer system sends to a third computer system within the third domain for the third system to forward to the printer. the content, or a message that the content is available to be obtained by the printer (block 406). Referring back to FIGS. 2 and 3, content sending module 250 or 350 may be responsible for implementing block 406.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium containing instructions, the instructions when executed by a processor causing the processor to:
   receive, at a first computer system included within a first domain, a request from a mobile requester computing device to send content to a network connected printer identified according to a printer identifier attributing the printer to a second domain, wherein the printer is included within a third domain;
   send a validation request message to a second computer system within the second domain requesting validation of the printer identifier; and
   responsive to receipt of validation information from the second system send to a third computer system within the third domain, for the third system to forward to the printer,
   the content, or
   a content availability message that the content is available to be obtained by the printer.

2. The medium of claim 1, wherein the first computer system hosts a public cloud printing service.

3. The medium of claim 1, wherein the validation information includes an instruction to send the content or the content availability message to the third system.

4. The medium of claim 1, wherein the validation information includes an address for the third system.

5. The medium of claim 1, wherein the instructions cause the processor to receive from the printer a content delivery request and responsive to receipt of the content delivery request send the content to the printer.

6. The medium of claim 1, wherein prior to sending the content or the content availability message to the third system, the first system is electronically connected to the third system via an XMPP interface.

7. The medium of claim 1, wherein the instructions additionally cause the processor to
   receive from the third system a request to provide an address of the second system; and
   provide the address of the second system to the third system.

8. The medium of claim 1, wherein the instructions cause the processor to send a policy validation request message to the second system requesting policy validation for the received request.

9. The medium of claim 8, wherein the requested policy validation includes validation of content type.

10. The medium of claim 8, wherein the requested policy validation includes validation of a computing device that sends the request to the first computer system.

11. The medium of claim 8, wherein the requested policy validation includes validation of a payment due in connection with printing of the content.

12. A system, comprising a memory and a processor to execute instructions stored in the memory to implement modules, the modules comprising:
   a print request receipt module, configured to receive, at a first computer system included within a first domain, a request from a mobile requester computing device to send content to a network connected printer identified according to a printer identifier attributing the printer to a second domain, wherein the printer is included within a third domain;
   a validation module, configured to send a validation request message to a second computer system within the second domain requesting validation of the printer identifier; and
   a content sending module, configured to, responsive to receipt of validation information from the second system, send to a third computer system within the third domain, for the third system to forward to the printer,
   the content, or
   a content availability message that the content is available for retrieval via a network by the printer.

13. The system of claim 12, wherein the first domain is a public cloud printing service.

14. The system of claim 12, wherein the validation information includes a command to send the content or the content availability message to the third system.

15. The system of claim 12, wherein the validation information includes an address for the third system.

16. The system of claim 12, wherein the content sending module is configured to receive from the printer a content delivery request and responsive to receipt of the content delivery request send the content to the printer.

17. The system of claim 12, further comprising an address module, configured to
   receive from the third system a request to provide an address of the second system, the request generated in connection with a user request to register the printer within the third system utilizing the printer identifier; and
   provide the address of the second system to the third system to enable the third system to instruct or request that the print requests addressed to the printer identifier and received by the second system be directed to the third system.

18. The system of claim 12, further comprising a policy module, configured to
   send a policy validation message to the second system requesting policy validation for the received request, and
   receive the policy validation from the second system.

19. The system of claim 18, wherein the requested policy validation includes validation of content type, validation of a computing device that sends the request to the first computer system, or validation of a payment due in connection with printing of the content.

20. A non-transitory computer-readable storage medium containing instructions, the instructions when executed by a processor causing the processor to:
- receive a request from a mobile requester computing device, at a first computer system included within a first domain, to send content to a network connected printer identified according to a printer identifier attributing the printer to a second domain, wherein the printer is included within a third domain;
- send a printer identifier validation request message to a second computer system within the second domain requesting validation of the printer identifier;
- send a policy validation request message to the second system requesting policy validation for the received request to send the content to the printer;
- responsive to receipt of printer identifier validation information from the second system including an address for a third computer system within the third domain, and receipt of policy validation for the print job from the second system, send to a third computer system within the third domain, for the third system to forward to the printer, a content availability message that the content is available for retrieval via a network by the printer;
- responsive to receipt of a content delivery request from the printer, send the content to the printer.

* * * * *